US012595122B2

(12) United States Patent
Chang et al.

(10) Patent No.: US 12,595,122 B2
(45) Date of Patent: Apr. 7, 2026

(54) POWERED INDUSTRIAL TRUCK

(71) Applicants: Jung-Chieh Chang, Miaoli (TW);
Yi-Sheng Chen, Miaoli (TW);
Jen-Yung Hsiao, Miaoli (TW);
Chia-Fu Hsiao, Miaoli (TW); **Wei-Qi
Lao, Miaoli (TW); Chen-Chih Chan**,
Miaoli (TW); Chung-Yu Liu, Miaoli
(TW)

(72) Inventors: Jung-Chieh Chang, Miaoli (TW);
Yi-Sheng Chen, Miaoli (TW);
Jen-Yung Hsiao, Miaoli (TW);
Chia-Fu Hsiao, Miaoli (TW); **Wei-Qi
Lao, Miaoli (TW); Chen-Chih Chan**,
Miaoli (TW); Chung-Yu Liu, Miaoli
(TW)

(73) Assignee: Jung-Chieh Chang, Miaoli County
(TW)

( * ) Notice: Subject to any disclaimer, the term of this
patent is extended or adjusted under 35
U.S.C. 154(b) by 357 days.

(21) Appl. No.: 18/370,906

(22) Filed: Sep. 21, 2023

(65) Prior Publication Data

US 2024/0116707 A1 Apr. 11, 2024

(30) Foreign Application Priority Data

Oct. 5, 2022 (TW) .................................. 111210868

(51) Int. Cl.
B65G 1/04 (2006.01)
(52) U.S. Cl.
CPC .................................. B65G 1/0435 (2013.01)

(58) Field of Classification Search
CPC ............................ B65G 1/0435; B65G 1/0492
See application file for complete search history.

(56) References Cited

U.S. PATENT DOCUMENTS

| | | | | |
|---|---|---|---|---|
| 5,199,840 A * | 4/1993 | Castaldi | ............... | B65G 1/0435 |
| | | | | 414/280 |
| 6,149,366 A * | 11/2000 | Deandrea | ............. | B65G 1/0414 |
| | | | | 414/279 |
| 6,280,135 B1 * | 8/2001 | Cunningham | ....... | B23D 35/008 |
| | | | | 414/280 |
| 8,790,061 B2 * | 7/2014 | Yamashita | ........... | B65G 1/0435 |
| | | | | 414/280 |
| 9,718,617 B2 * | 8/2017 | Koide | .................. | B65G 1/0492 |
| 9,738,448 B1 * | 8/2017 | Yamagishi | ........... | B65G 1/0435 |
| 10,518,974 B2 * | 12/2019 | Lee | ....................... | B65G 1/0492 |
| 11,208,264 B2 * | 12/2021 | Moulin | ................ | B65G 1/0435 |

* cited by examiner

*Primary Examiner* — Jonathan Snelting

(57) ABSTRACT

A powered industrial truck includes a lateral movement
assembly including four sliding members and four pivotal
members both on a wheeled carriage, four links having a
first end pivotably secured to the sliding member and a
second end pivotably secured to either end of the pivotal
member, a motor shaft having two ends pivotably secured to
the pivotal members respectively, a first electric motor on
one frame member, and four mounts attached to the sliding
members respectively; two lift assemblies including a sec-
ond electric motor, a shaft having two ends rotatably secured
to the sliding members respectively, two gear trains at the
ends of the shaft respectively, a first gear connected to the
second electric motor, a second gear on the shaft, and a first
roller chain on the first and second gears; two electric
attachments on the platform and being laterally moveable,
each attachment. The mount has rollers.

1 Claim, 10 Drawing Sheets

POWERED INDUSTRIAL TRUCK

BACKGROUND OF THE INVENTION

1. Field of the Invention

The invention relates to powered industrial trucks and more particularly to an electrically powered industrial truck and having improved characteristics.

2. Description of Related Art

Conventional powered industrial trucks have complicated components and are prone to malfunction because they are powered by both a hydraulic cylinder and an electric motor. Thus, the need for improvement still exists.

SUMMARY OF THE INVENTION

It is therefore one object of the invention to provide a powered industrial truck comprising two racks; a carriage including two frame members, two opposing seats on each frame member, and a platform on a top; a lateral movement assembly including four sliding members slidably disposed on the seats respectively, two pivotal elongated members disposed on intermediate portions of the frame members respectively, four links each having a first end pivotally secured to an end of the sliding member and a second end pivotally secured to either end of the pivotal elongated member, a motor shaft having two ends pivotally secured to intermediate portions of the pivotal elongated members respectively, a first electric motor disposed on one of the frame members, and four mounts attached to the sliding members respectively, the mount having a plurality of rollers; two lift assemblies each including a second electric motor, a shaft having two ends rotatably secured to the sliding members respectively, two gear trains disposed at the ends of the shaft respectively, a first gear rotatably connected to the second electric motor, a second gear disposed on the shaft, and a first roller chain disposed on the first and second gears; two attachments disposed on the platform and being laterally moveable, each of the attachments including a third electric motor, two spaced sprockets wherein one of the sprockets is rotatably secured to the third electric motor, a second roller chain disposed on the sprockets, a toothed elongated member meshed with the second roller chain, and a rope having a first end attached to the toothed elongated member, and a fork connected to a second end of the rope; two wheel assemblies each including a wheel rotatably disposed on either side of a bottom of the carriage, and a servo motor disposed in the a carriage for driving the wheel; two casters disposed at front and rear ends of the a carriage respectively; and a plurality of rails mounted on the racks, each rail including a groove having two end holes and two projecting limit members at two sides respectively, a chain disposed in the groove, and two pins each passing through the end hole and either end of the chain, each pin having two end troughs and two snap rings each disposed in the trough to fasten the pin and the groove together.

The above and other objects, features and advantages of the invention will become apparent from the following detailed description taken with the accompanying drawings.

DETAILED DESCRIPTION OF THE INVENTION

Figure 1:
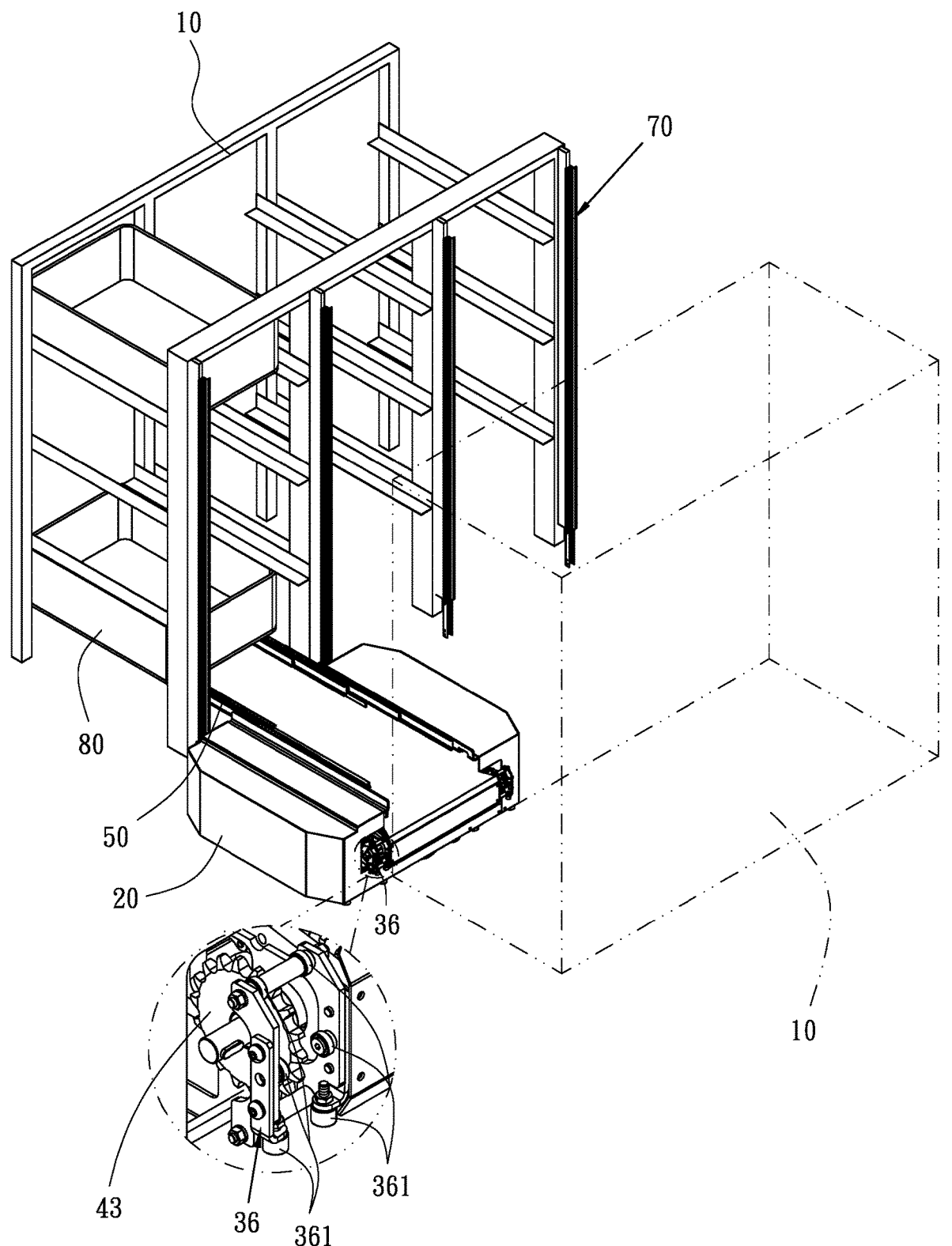
FIG. 1 is a perspective view of a powered industrial truck according to the invention.
Figure 2:
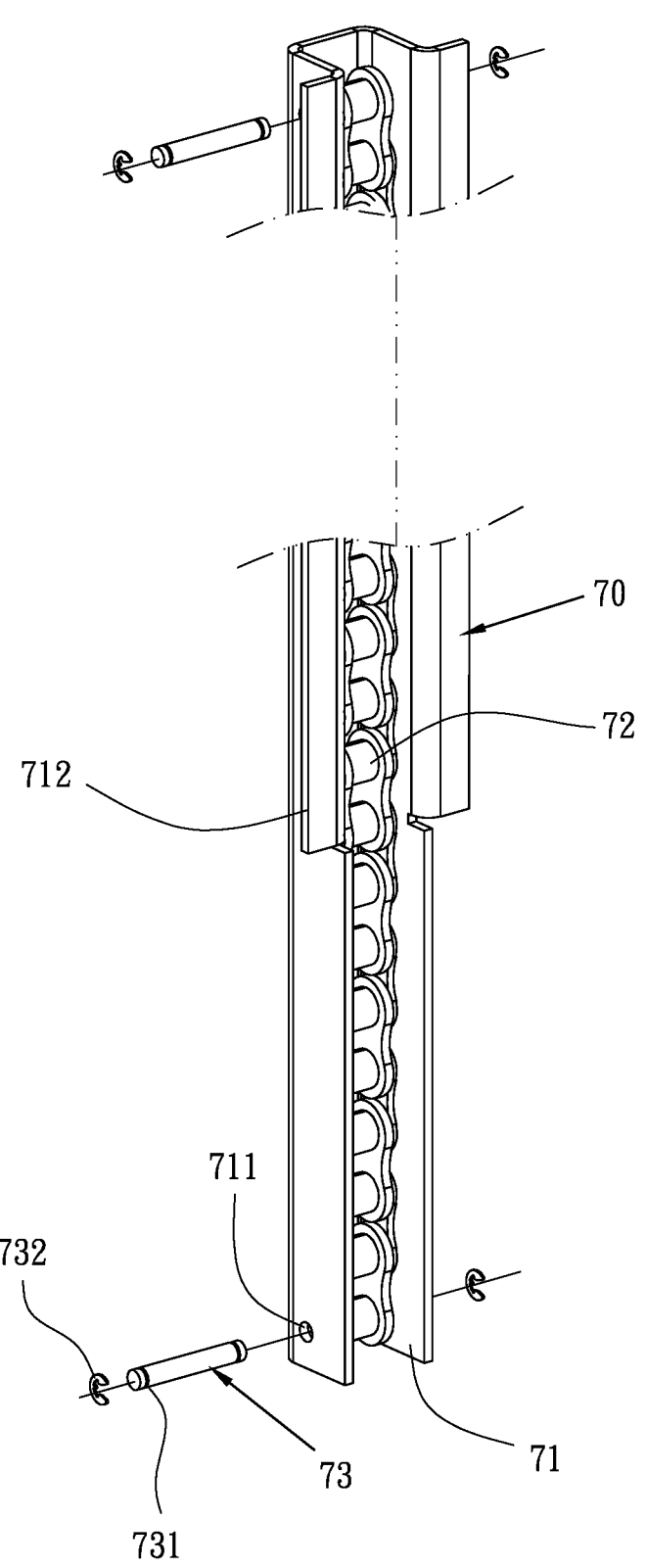
FIG. 2 is an exploded view of the rail.
Figure 3:
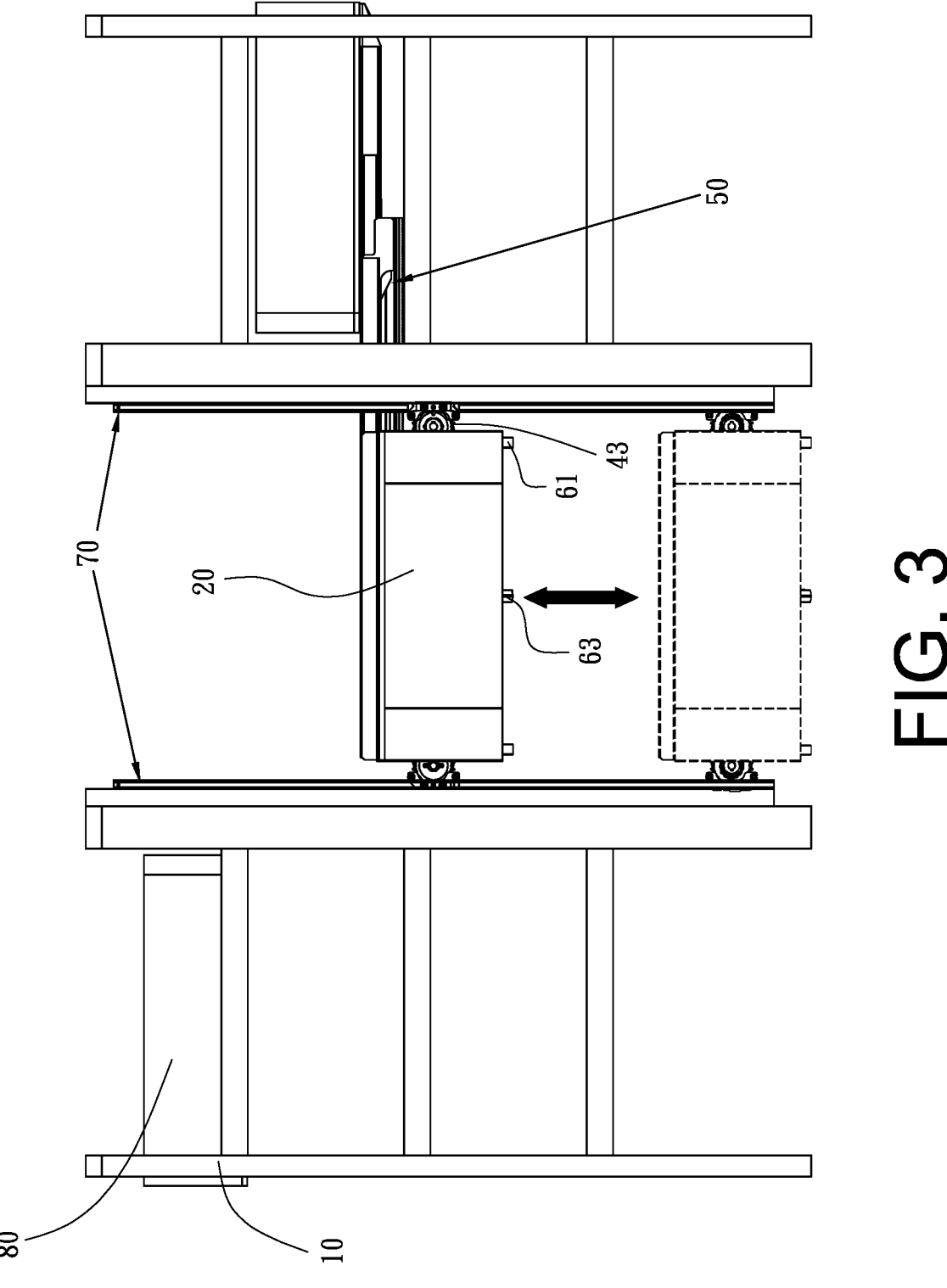
FIG. 3 is a front view schematically depicting the carriage being lifted in an operation.
Figure 4:
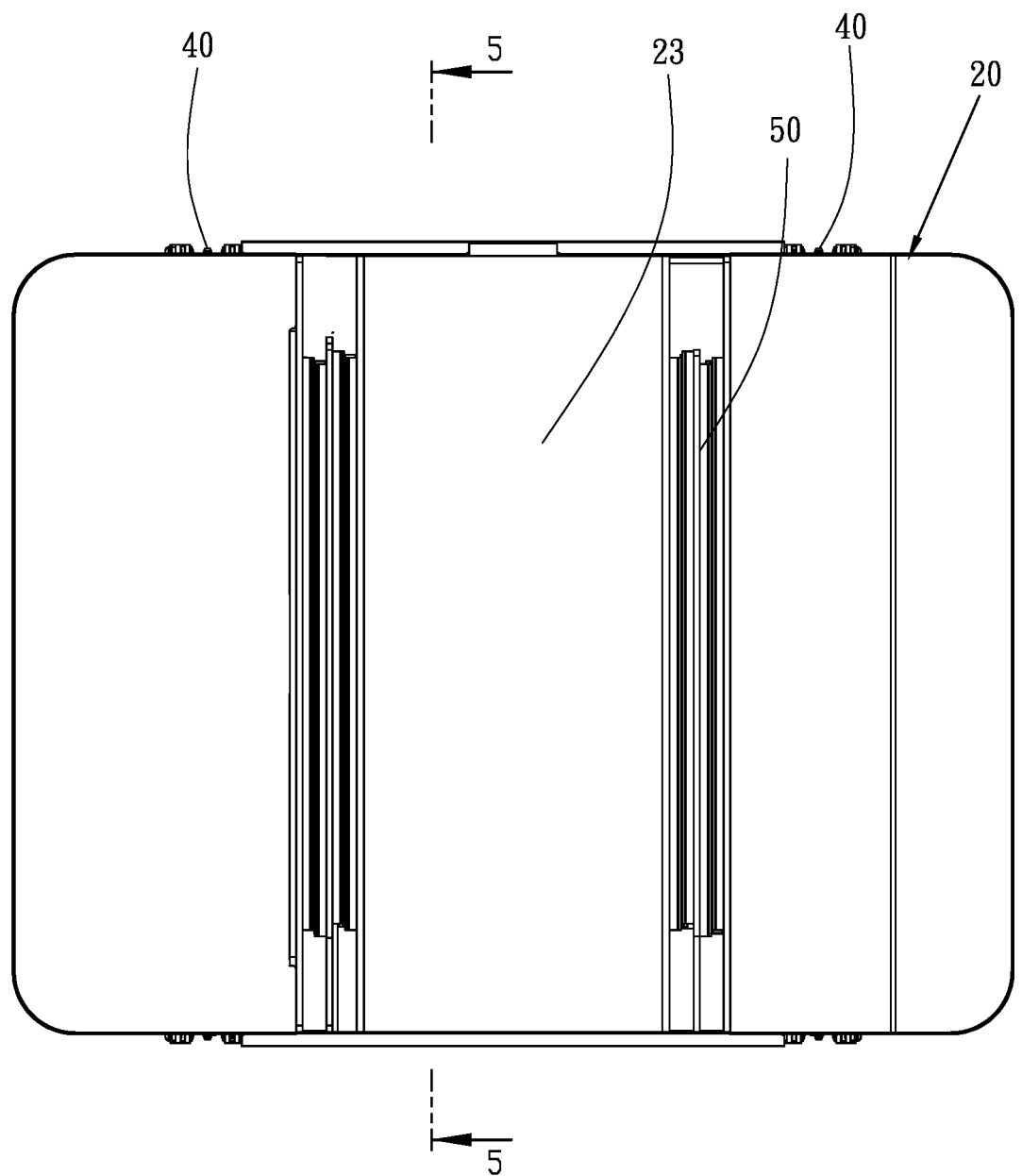
FIG. 4 is a top plan view of the carriage.
Figure 5:
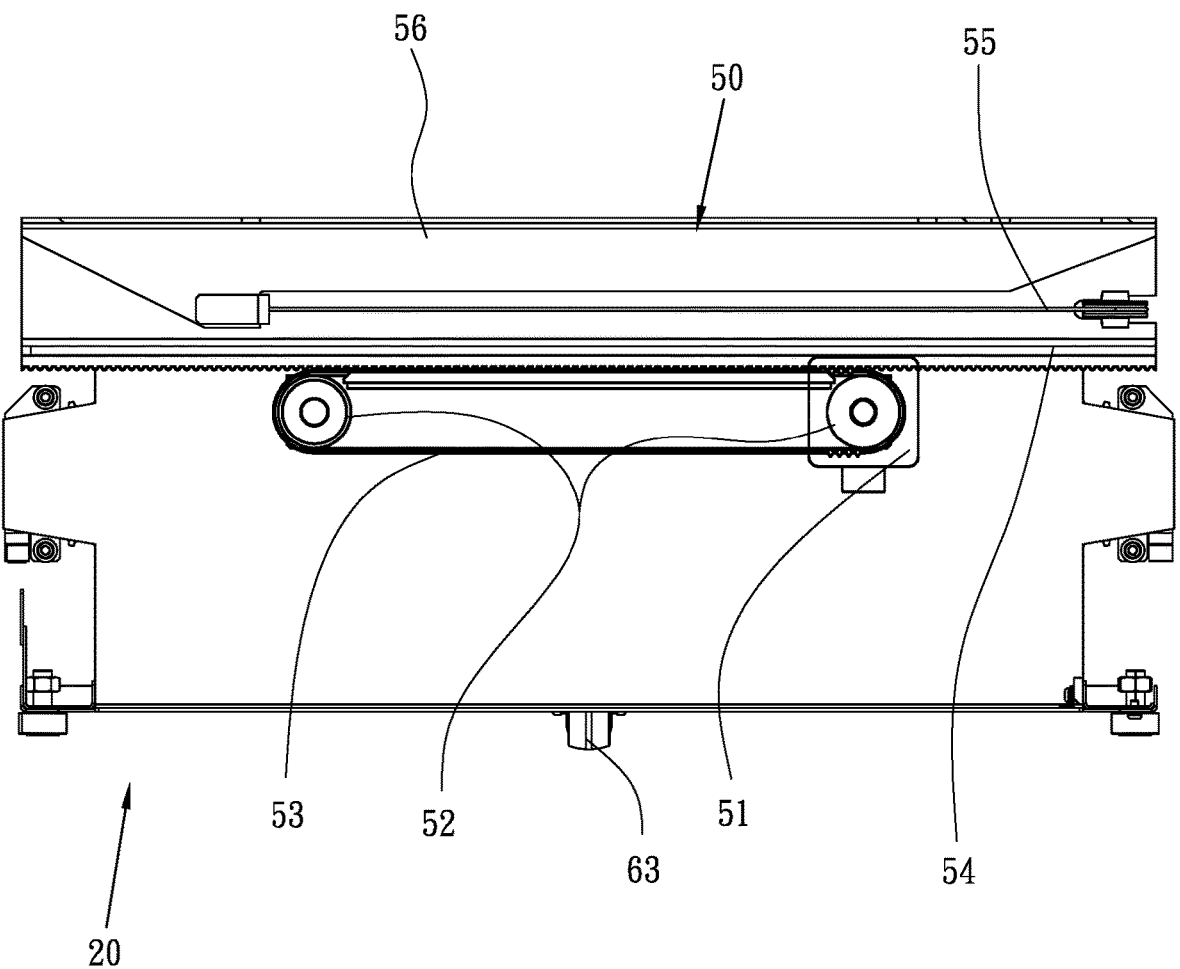
FIG. 5 is a sectional view taken along line 5-5 of FIG. 4.
Figure 6:
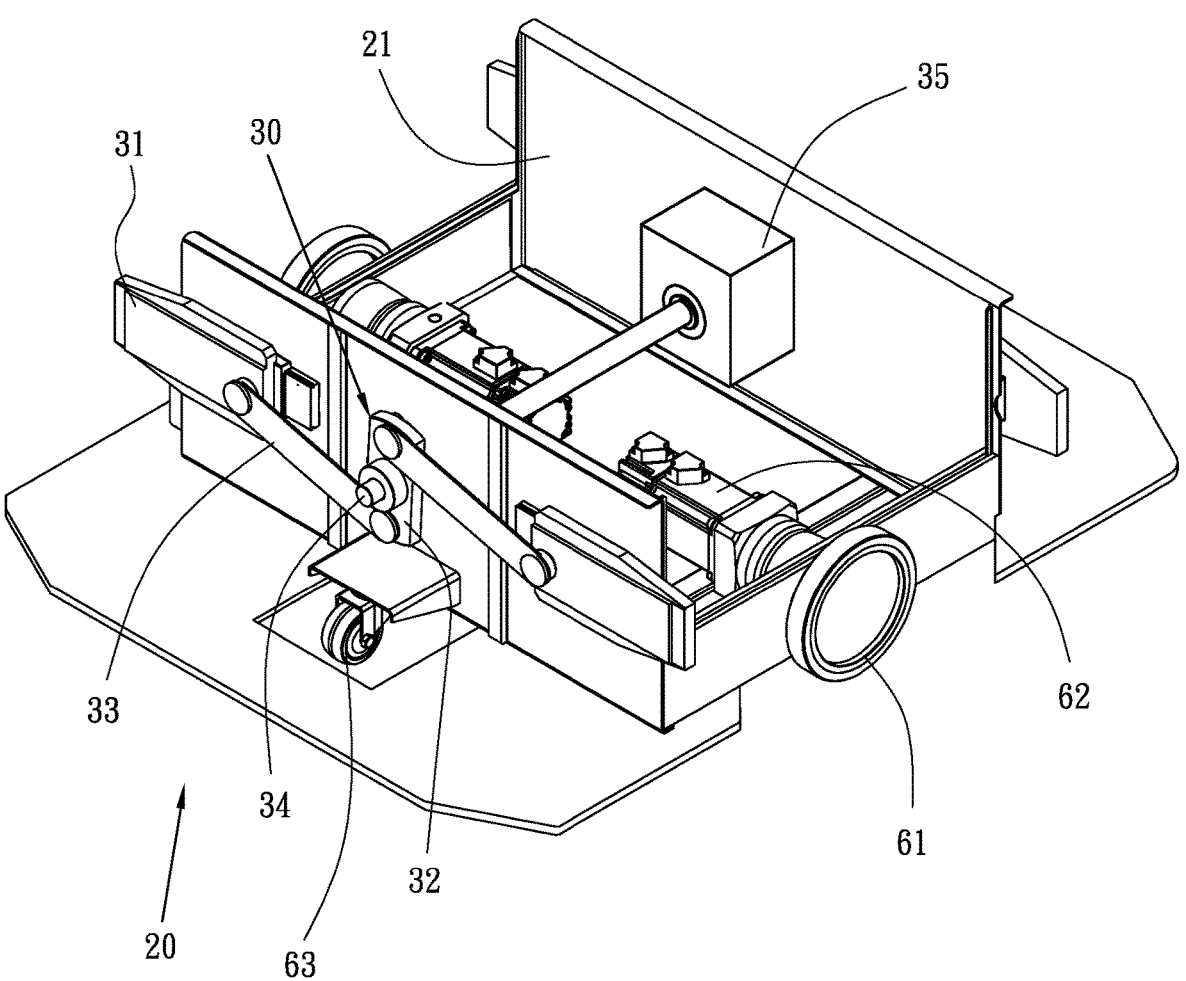
FIG. 6 is a perspective view of the lateral movement assembly and the wheel assembly mounted in the carriage.
Figure 7:
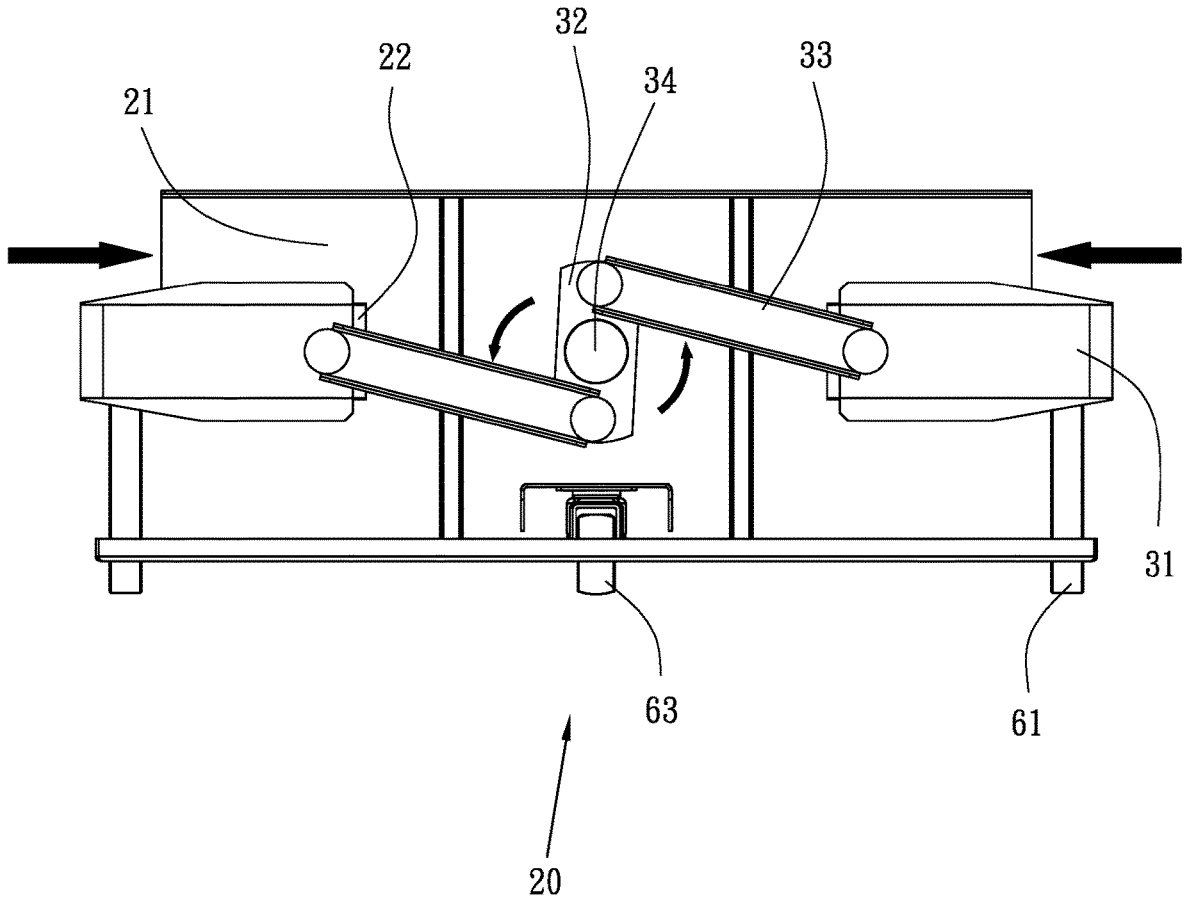
FIG. 7 is a front view schematically showing the sliding members moving inward.
Figure 8:
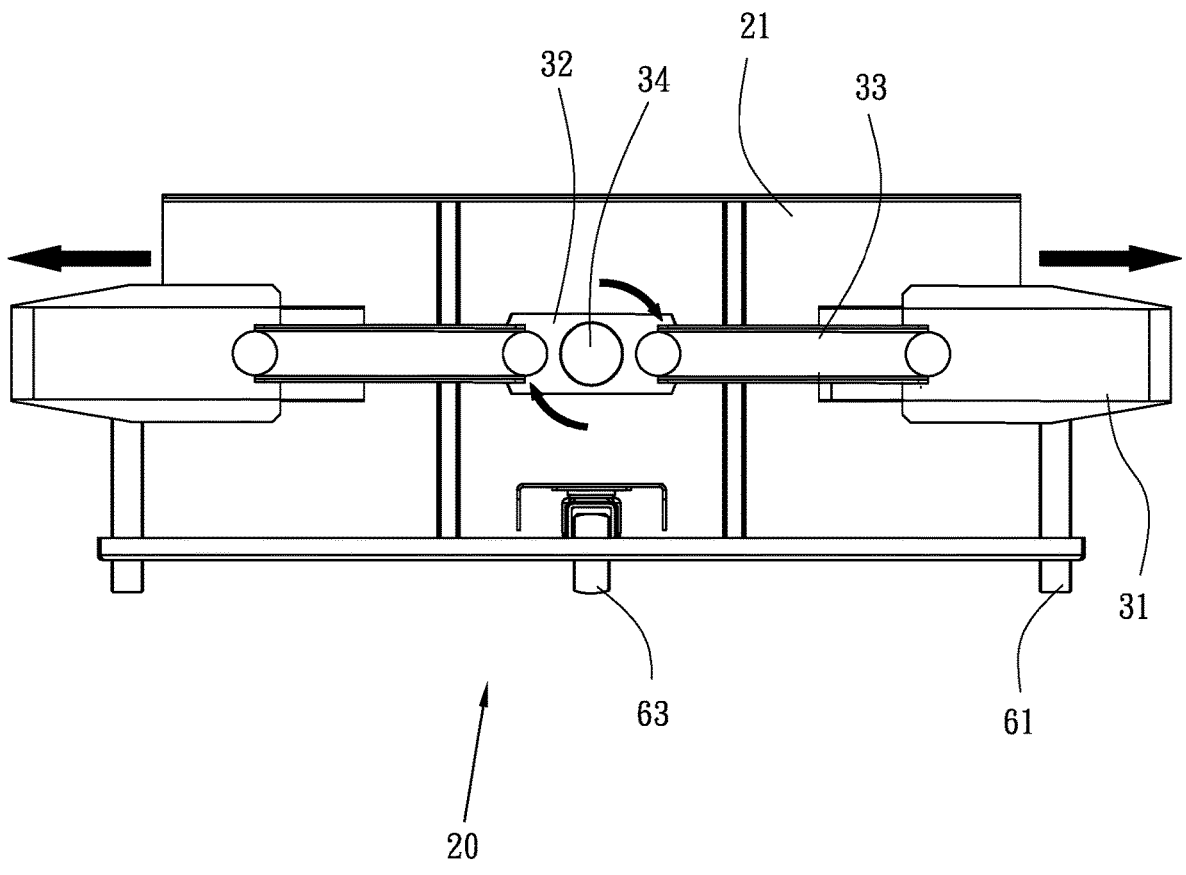
FIG. 8 is a front view schematically showing the sliding members moving outward.
Figure 9:
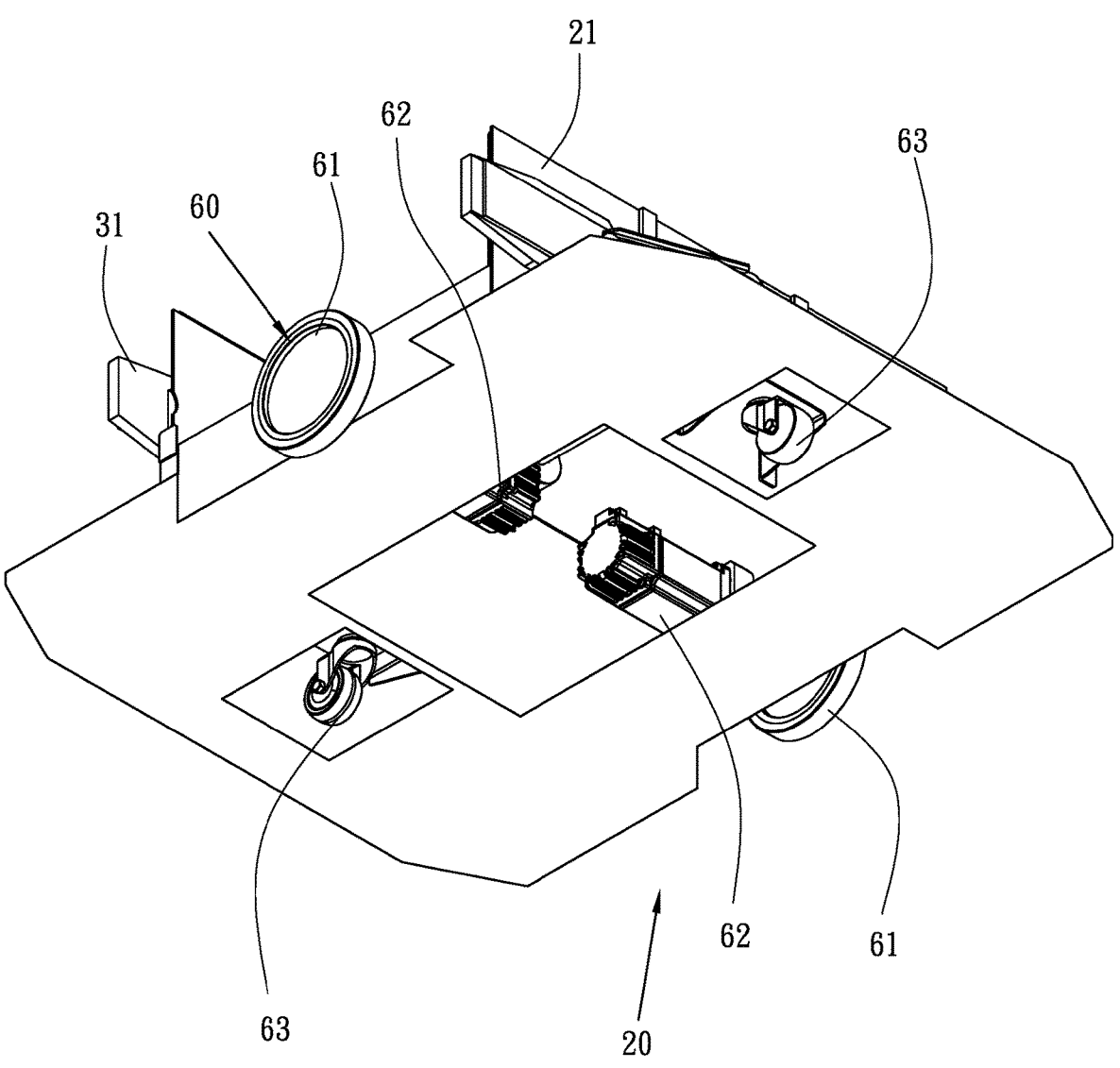
FIG. 9 is a perspective view of the lateral movement assembly and the wheel assembly mounted in the carriage viewing from the bottom.
Figure 10:
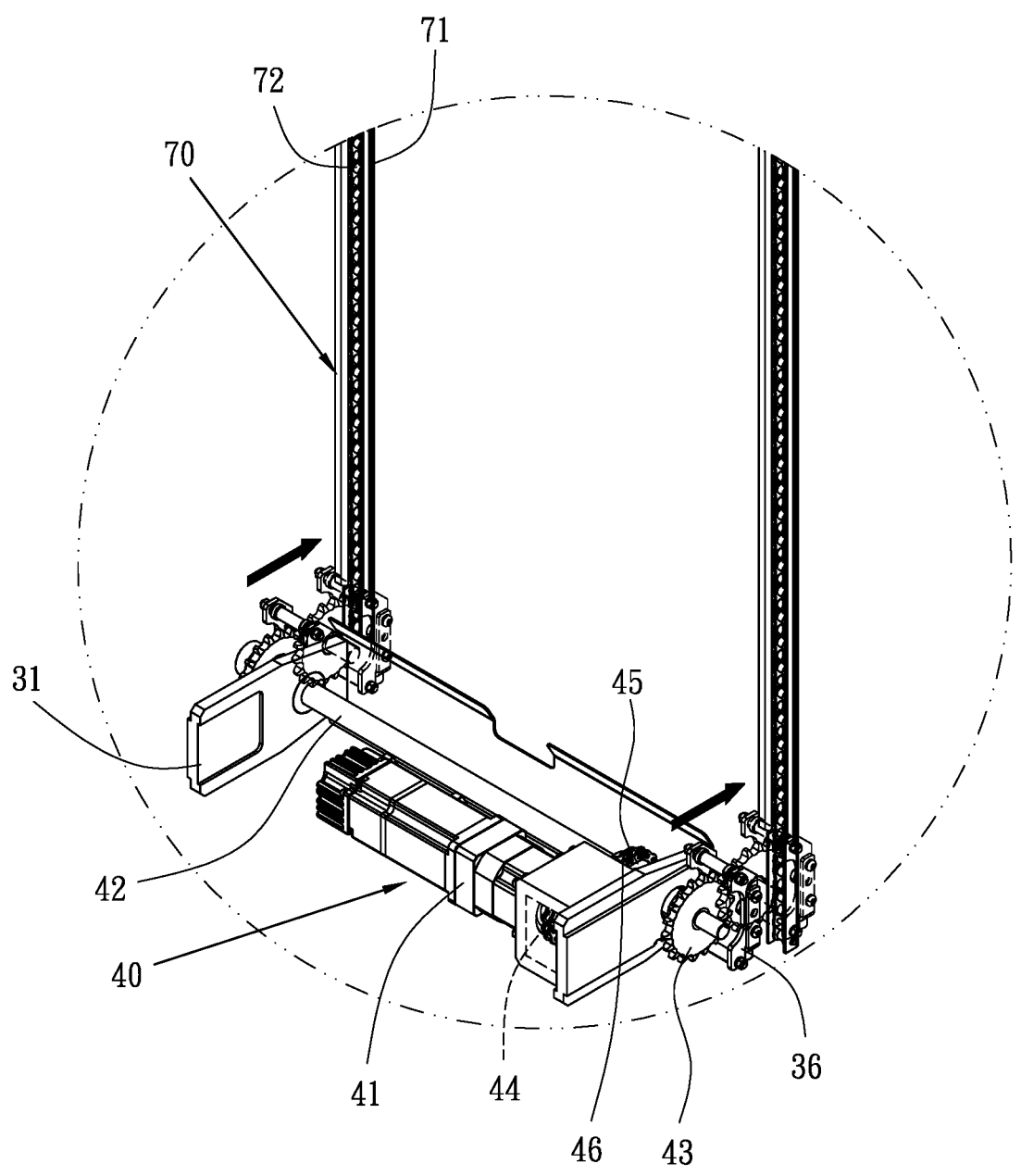
FIG. 10 is a perspective view of the lift assembly being attached to the rails in the operation.

Referring to FIGS. 1 to 10, a powered industrial truck in accordance with the invention comprises two racks 10; a carriage 20 including two frame members 21, two opposing seats 22 on each frame member 21, and a platform 23 on a top; a lateral movement assembly 30 including four sliding members 31 slidably disposed on the seats 22 respectively, two pivotal elongated members 32 disposed on intermediate portions of the frame members 21 respectively, four links 33 each having a first end pivotally secured to an end of the sliding member 31 and a second end pivotally secured to either end of the pivotal elongated member 32, a motor shaft 34 having two ends pivotally secured to intermediate portions of the pivotal elongated members 32 respectively, a first electric motor 35 disposed on one of the frame members 21, and four mounts 36 attached to the sliding members 31 respectively, the mount 36 having a plurality of rollers 361; two lift assemblies 40 each including a second electric motor 41, a shaft 42 having two ends rotatably secured to the sliding members 31 respectively, two gear trains 43 disposed at the ends of the shaft 42 respectively, a first gear 44 rotatably connected to the second electric motor 41, a second gear 45 disposed on the shaft 42, and a first roller chain 46 disposed on the first gear 44 and the second gear 45; two attachments 50 disposed on the platform 23 and being laterally moveable, each of the attachments 50 including a third electric motor 51, two spaced sprockets 52 in which one of the sprockets 52 is rotatably secured to the third electric motor 51, a second roller chain 53 disposed on the sprockets 52, a toothed elongated member 54 meshed with the second roller chain 53, and a rope 55 having a first end attached to the toothed elongated member 54, and a fork 56 connected to a second end of the rope 55; two wheel assemblies 60 each including a wheel 61 rotatably disposed on either side of a bottom of the carriage 20, and a servo motor 62 disposed in the a carriage 20 for driving the wheel 61; two casters 63 disposed at front and rear ends of the a carriage 20 respectively; and a plurality of rails 70 mounted on the racks 10, each rail 70 including a groove 71 having two end holes 711 and two projecting limit members 712 at two sides respectively, a chain 72 disposed in the groove 71, and two pins 73 each passing through the end hole 711 and either end of the chain 72, each pin 73 having two end troughs 731 and two snap rings 732 each disposed in the trough 731 to fasten the pin 73 and the groove 71 together.

In operation, the servo motors 62 are activated so that an employee may drive the powered industrial truck to a desired place in a warehouse. Next, the employee may activate the first electric motor 35. Power of the first electric motor 35 is transmitted to the pivotal elongated members 32 via the motor shaft 34 so that the pivotal elongated members 32 may clockwise or counterclockwise pivot. And in turn, the sliding members 31 move to desired positions via the pivotal motions of the links 33. Further, the employee may mesh the gear trains 43 with the chains 72. Finally, the employee may activate the second electric motors 41 to either lift or lower the carriage 20 to its desired position. It is noted that the rollers 361 are used to maintain the meshing engagement of the gear trains 43 and the chains 72.

For unloading cargo, the third electric motors 51 may clockwise rotate to pull the rope 55 in one direction. And in turn, the forks 56 push a box 80 into the rack 10. Next, the third electric motors 51 may counterclockwise rotate to pull the rope 55 in the opposite direction. And in turn, the forks 56 disengage from the rack 10 to dispose on the carriage 20.

For loading cargo, the third electric motors 51 may clockwise rotate to pull the rope 55 in one direction. And in turn, the forks 56 push to a position under the box 80 in the rack 10. Next, the third electric motors 51 may counterclockwise rotate to pull the rope 55 in the opposite direction. And in turn, the forks 56 pull the box 80 out of the rack 10 to dispose on the carriage 20.

While the invention has been described in terms of preferred embodiments, those skilled in the art will recognize that the invention can be practiced with modifications within the spirit and scope of the appended claims.

What is claimed is:

1. A powered industrial truck, comprising:

two racks;

a carriage including two frame members, two opposing seats on each frame member, and a platform on a top;

a lateral movement assembly including four sliding members slidably disposed on the seats respectively, two pivotal elongated members disposed on intermediate portions of the frame members respectively, four links each having a first end pivotally secured to an end of the sliding member and a second end pivotably secured to either end of the pivotal elongated member, a motor shaft having two ends pivotably secured to intermediate portions of the pivotal elongated members respectively, a first electric motor disposed on one of the frame members, and four mounts attached to the sliding members respectively, each mount having a plurality of rollers;

two lift assemblies each including a second electric motor, a shaft having two ends rotatably secured to the sliding members respectively, two gear trains disposed at the ends of the shaft respectively, a first gear rotatably connected to the second electric motor, a second gear disposed on the shaft, and a first roller chain disposed on the first and second gears;

two attachments disposed on the platform and being laterally moveable, each of the attachments including a third electric motor, two spaced sprockets wherein one of the sprockets is rotatably secured to the third electric motor, a second roller chain disposed on the sprockets, a toothed elongated member meshed with the second roller chain, and a rope having a first end attached to the toothed elongated member, and a fork connected to a second end of the rope;

two wheel assemblies each including a wheel rotatably disposed on either side of a bottom of the carriage, and a servo motor disposed in the carriage for driving the wheel;

two casters disposed at front and rear ends of the carriage respectively; and a plurality of rails mounted on the racks, each rail including a groove having two end holes and two projecting limit members at two sides respectively, a chain disposed in the groove, and two pins each passing through one of the end holes and either end of the chain, each pin having two end troughs and two snap rings each disposed in one of the end troughs to fasten the pin and the groove together.

* * * * *